(12) United States Patent
Haupt et al.

(10) Patent No.: US 10,260,572 B2
(45) Date of Patent: Apr. 16, 2019

(54) CLUTCH ASSEMBLY, DRIVE ASSEMBLY, AND SENSOR UNIT

(71) Applicant: GKN Automotive Ltd., Redditch, Worcestershire (GB)

(72) Inventors: Jan Haupt, Kürten (DE); Jörg Jacoby, Düsseldorf (DE); Falk Siebenhandl, Bonn (DE); Colin Zaers, Königswinter (DE); Holger Seidl, Siegburg (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 25 days.

(21) Appl. No.: 15/329,691

(22) PCT Filed: Aug. 3, 2015

(86) PCT No.: PCT/EP2015/067844
§ 371 (c)(1),
(2) Date: Jan. 27, 2017

(87) PCT Pub. No.: WO2016/020333
PCT Pub. Date: Feb. 11, 2016

(65) Prior Publication Data
US 2017/0219023 A1 Aug. 3, 2017

(30) Foreign Application Priority Data
Aug. 5, 2014 (DE) ......................... 10 2014 215 449

(51) Int. Cl.
*F16D 27/118* (2006.01)
*F16H 48/34* (2012.01)
(Continued)

(52) U.S. Cl.
CPC .......... *F16D 27/118* (2013.01); *F16D 27/108* (2013.01); *F16H 48/08* (2013.01);
(Continued)

(58) Field of Classification Search
None
See application file for complete search history.

(56) References Cited

U.S. PATENT DOCUMENTS 6,070,865 A * 6/2000 Schroeder ................. G01P 1/02
269/47
6,913,129 B2 7/2005 Ezure et al.
(Continued)

FOREIGN PATENT DOCUMENTS

DE  10 2009 056 088 A1  9/2011
DE  11 2011 101 784 T5  5/2013
(Continued)

OTHER PUBLICATIONS

International Search Report and Written Opinion for PCT/EP2015/067844 dated Nov. 11, 2015 (with English translation; 12 pages).

*Primary Examiner* — Mark A Manley
(74) *Attorney, Agent, or Firm* — Bejin Bieneman PLC

(57) ABSTRACT

A clutch assembly comprises a housing; a first drive part rotatingly drivable around an axis of rotation; a second drive part rotatable relative to the first drive part; a clutch which is arranged in the power path between the first drive part and the second drive part and which comprises a first clutch part which is connected to the first drive part in a rotationally fixed and axially movable way and a second clutch part which is drivingly connected to the second drive part; a controllable actuator for actuating the clutch; a sensor unit for determining a position signal which represents the axial position of the first clutch part, wherein the sensor unit comprises a target element which is at least indirectly connected to the first clutch part, and a sensor connected to the housing for recording a position of the target element; and adjusting means for adjusting the position of the sensor relative to the housing.

8 Claims, 8 Drawing Sheets

(51) Int. Cl.
*F16H 48/08* (2006.01)
*F16H 48/24* (2006.01)
*F16D 27/108* (2006.01)
*B60K 1/00* (2006.01)
*B60K 17/16* (2006.01)

(52) U.S. Cl.
CPC ............ *F16H 48/24* (2013.01); *F16H 48/34* (2013.01); *B60K 1/00* (2013.01); *B60K 17/165* (2013.01); *F16D 2300/18* (2013.01)

(56) References Cited

U.S. PATENT DOCUMENTS

| 7,325,664 B2 | 2/2008 | Fusegi |
| 2003/0096673 A1 | 5/2003 | Ezure et al. |

FOREIGN PATENT DOCUMENTS

| EP | 1435479 A2 | 7/2004 |
| EP | 1568917 A2 | 8/2005 |
| EP | 2336602 A2 | 6/2011 |
| JP | H03111294 U | 11/1991 |
| JP | H05002720 U | 1/1993 |
| JP | 2003154860 A | 5/2003 |
| JP | 2006046594 A | 2/2006 |
| JP | 2010084930 A | 4/2010 |
| JP | 2013512402 A | 4/2013 |
| WO | 2011064364 A1 | 6/2011 |

\* cited by examiner

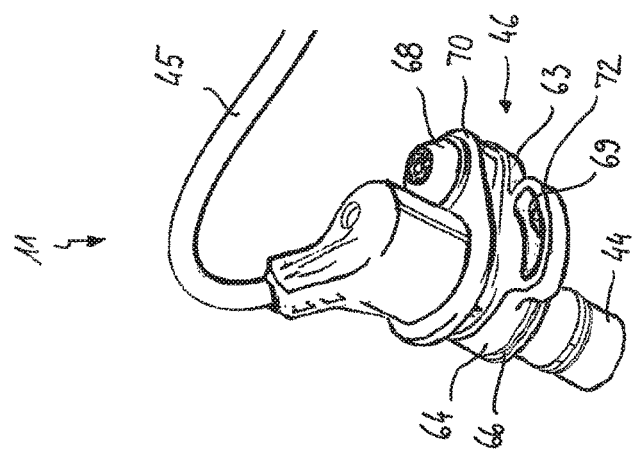
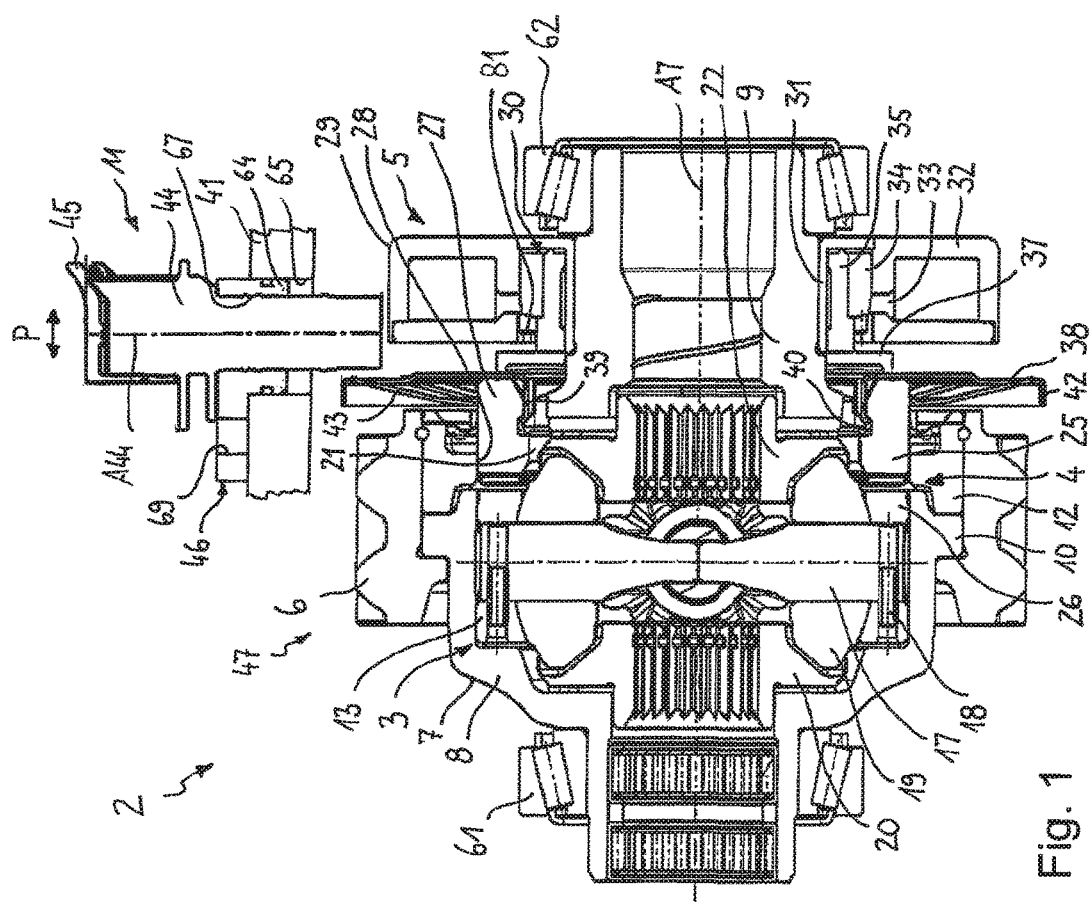
Fig. 2
Fig. 1

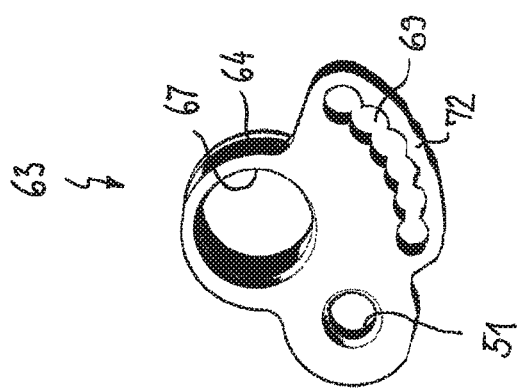
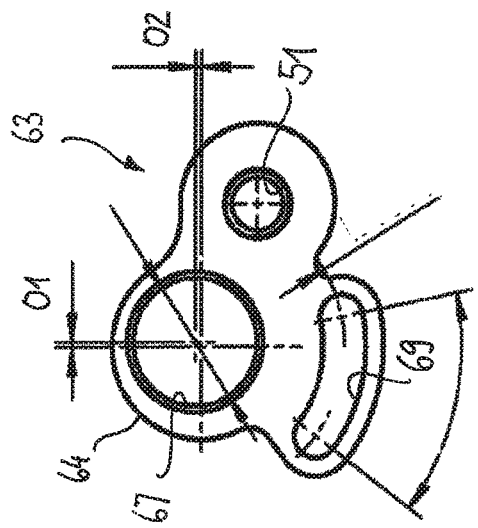
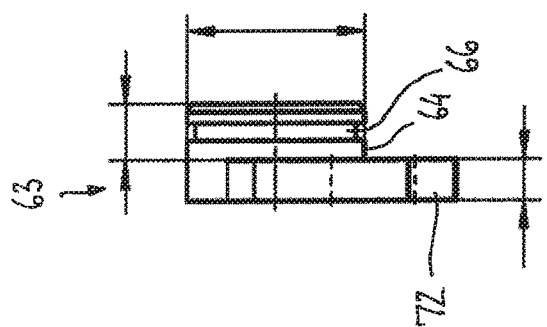
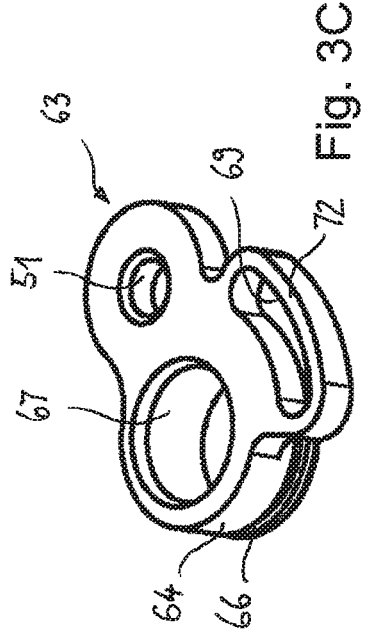
Fig. 3A
Fig. 3B
Fig. 3C
Fig. 4

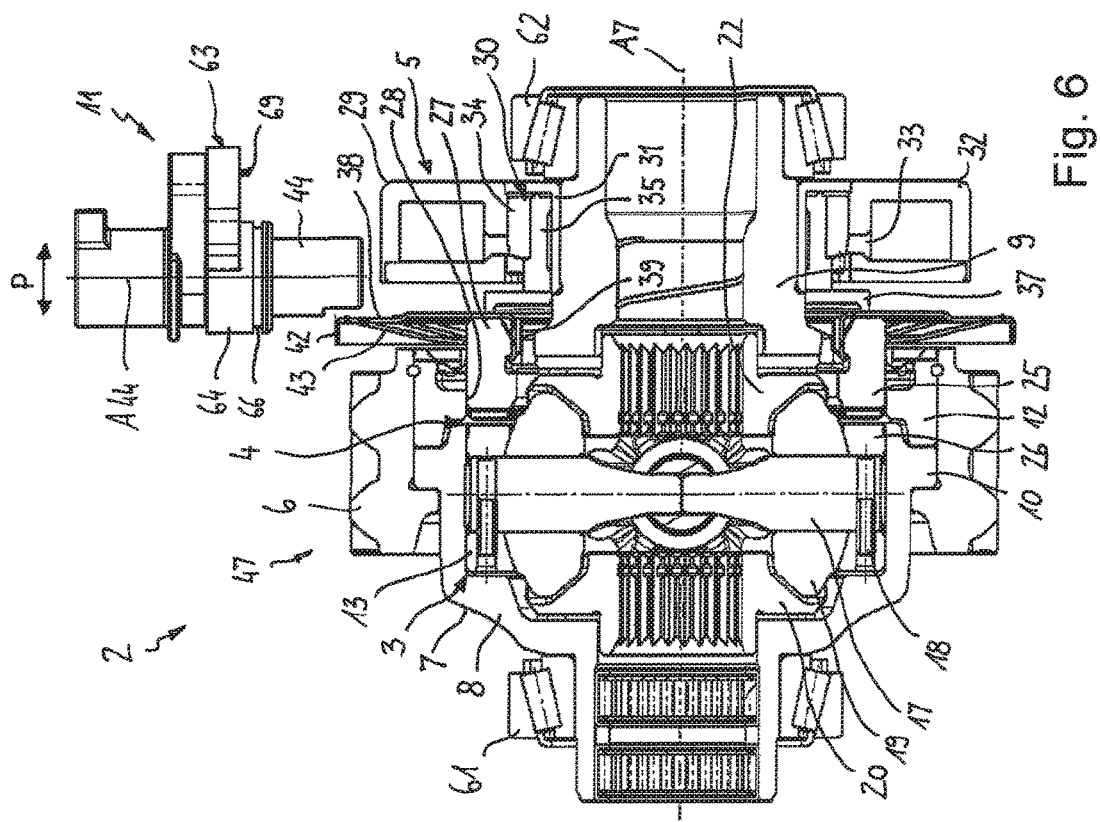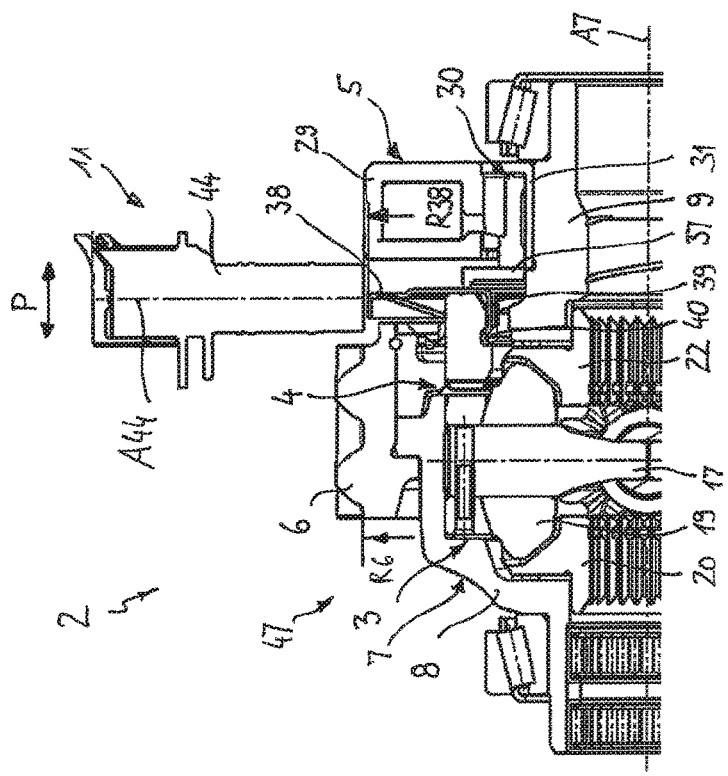

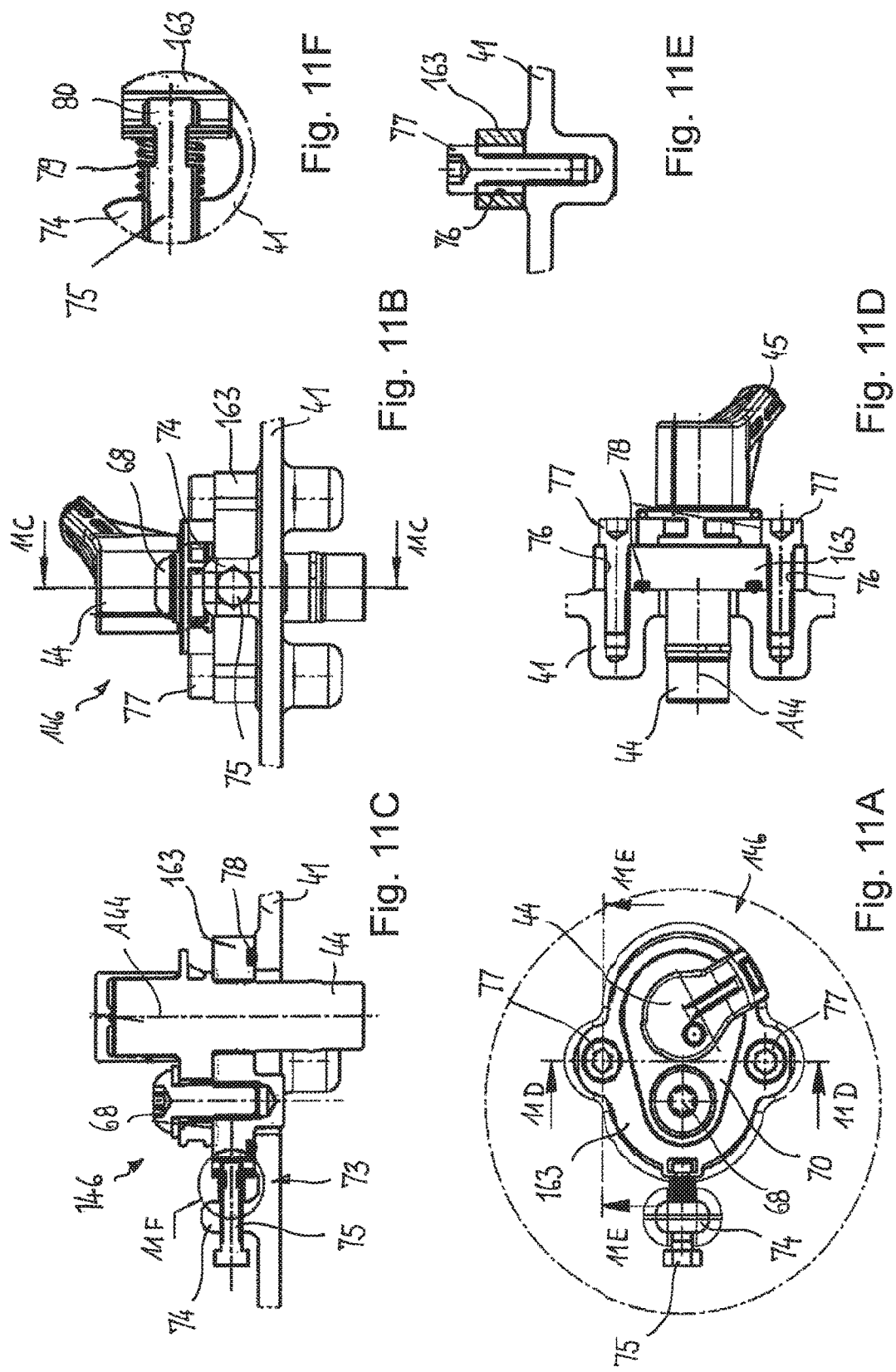

CLUTCH ASSEMBLY, DRIVE ASSEMBLY, AND SENSOR UNIT

CROSS-REFERENCE TO RELATED APPLICATIONS

This application is a national stage of, and claims priority to, Patent Cooperation Treaty Application No. PCT/EP2015/067844, filed on Aug. 3, 2015, which claims priority to German Application No. DE 10 2014 215 449.9 filed on Aug. 5, 2014, each of which applications are hereby incorporated herein by reference in their entireties.

BACKGROUND

From DE 10 2009 056 088 A1 a differential assembly is known comprising a driving gear, a differential drive and a clutch which is arranged between the driving gear and the differential drive. Furthermore, it is provided an electro-magnetic actuator for operating the clutch, a sensor for determining switching conditions of the clutch and a target element cooperating with the sensor.

JP 2006 046 594 A proposes a clutch engagement detecting device having a differential unit and a clutch unit. The clutch unit is arranged so as to be effective between a differential housing and a sideshaft gear of the differential unit and is controlled by an actuator. A sensor is provided which is able to detect a position of the movable clutch part.

From EP 2 336 602 A2 a differential mechanism is known of the type of a controllable locking differential. For controlling the locking differential an electro-magnetic actuator is provided which cooperates with a ball ramp assembly. A sensor unit with a sensor element is arranged so as to adjoin the differential housing and detects an axial movement of a sensing element of the differential mechanism. The sensor is provided in the form of a Hall sensor.

In assemblies according to the state of the art, the sensor is at times difficult to mount and difficult to access when a service is required.

DESCRIPTION

The present disclosure relates to a clutch assembly, e.g., for use in the driveline of a motor vehicle, having a clutch and a controllable actuator for operating the clutch such that a first clutch part and a second clutch part optionally can be connected to one another for transmitting torque and can be separated from one another again by being opened. Such clutch assemblies serve to control the transmission of torque between a drive source and a driving axle of a motor vehicle. Included in the disclosure is a drive assembly with such a clutch assembly as well as to a transmission unit, for example a differential drive which divides an introduced torque to the two sideshafts of the driving axle.

The clutch assembly can have a sensor unit, in particular for being used in a driveline of a motor vehicle, which sensor unit is easy to mount and which is easily accessible in cases where a service is required. A drive assembly can include such a clutch assembly.

An example clutch assembly comprises a housing; a first drive part which is rotatingly drivable around an axis of rotation; a second drive part which is rotatable relative to the first drive part; a clutch which is arranged in the power path between the first drive part and the second drive part and which comprises a first clutch part which is connected to the first drive part in a rotationally fixed and axially movable way and a second clutch part which is drivingly connected to the second drive part; a controllable actuator for actuating the clutch by axially moving the first clutch part relative to the second clutch part; a sensor unit for determining a position signal which represents the axial position of the first clutch part, wherein the sensor unit comprises a target element which is at least indirectly connected to the first clutch part and a sensor for sensing a position of the target element, wherein the sensor is releasably connected to the housing; and adjusting means for adjusting the position of the sensor relative to the housing.

An advantage is that the sensor of the sensor unit is easy to mount and accessible at the housing from the outside. In the case of a service, the sensor can easily be replaced as a separate component. With the help of the adjusting means the position of the sensor relative to the housing and thus to the target element can be adjusted. As a result, an axial movement of the target element can be reliably detected by the sensor. The target element is at least indirectly connected to the first clutch part. This is intended to include that the target element can be directly connected to the first clutch part or indirectly via one or several intermediate elements. In any case, the connection is such that the target element moves jointly with the first clutch part when the clutch is operated.

The sensor can be arranged such that a longitudinal axis of the sensor is arranged within an angular range of ±30°, in particular within a range of ±20°, or even ±10° relative to a plane extending perpendicularly relative to the rotational axis. According to one possibility, the sensor can be connected to the stationary housing in such a way that the sensor axis extends radially relative to the rotational axis, wherein an arrangement is not excluded in which the sensor axis crosses the rotational axis at a distance. An advantage of a substantially perpendicular arrangement of the sensor relative to the rotational axis is that a target element with a relatively short radial extension can be used, which also has an advantageous effect on the efficiency and switching times of the clutch. In addition, the sensor can be directed to a circumferential face of the target element.

The adjusting means serve to set the position of the sensor relative to the housing in the mounted condition of the sensor unit. In particular, the adjusting means can be generally any kind of mechanism or device which is suitable for adjusting and/or changing the position of the sensor relative to the housing. To that extent, the adjusting means can also be referred to as adjusting device or adjusting mechanism. In an example embodiment, the adjusting means are designed in such a way that the sensor can be set relative to the stationary housing at least one of radially and axially with respect to the rotational axis. This means that the adjusting means can allow the sensor to be adjusted axially and/or radially relative to the stationary housing. According to an example embodiment, the unit comprising of the sensor, the adjusting means and the housing is designed such that, when the housing is closed, the sensor and the adjusting means are accessible from the outside. In this way, the position of the sensor can easily be set even when the housing is closed. In addition, if necessary, the sensor can be replaced without having to open the housing. The housing can be a stationary housing of the clutch assembly in which the first drive part is rotationally supported around the rotational axis.

For radial adjustment the adjusting means can comprise at least one spacer disc which can be inserted between a supporting face of the sensor and a contact face of the stationary housing, with the term "radially" referring to the rotational axis of the clutch assembly and the first clutch part, respectively. In general, it shall apply that each spatial expression such as "radial" or "axial" shall refer to the rotational axis of the clutch assembly unless otherwise stated.

For axial adjustment, the adjusting means according to a first possibility—can comprise an adjusting element which is rotatable relative to the housing and in which the sensor is received, as well as at least one fixing element for fixing the adjusting element in a certain rotational position. The adjusting element can comprise a sleeve portion which, by means of a cylindrical outer face, is rotatably positioned in a bore of the stationary housing, as well as a through-bore which is eccentric relative to the sleeve portion and into which the sensor is inserted; wherein the adjusting element can be connected to the stationary housing in several rotational positions by the fixing element. Because the axis of the trough-bore is offset (eccentric) relative to the axis of the sleeve portion, rotating the adjusting element relative to the housing leads to a displacement of the sensor in the housing in the axial direction of the rotational axis. Thereby the degree of the axial displacement of the sensor is dependent on the rotational position of the adjusting element relative to the housing.

The adjusting element can be designed such that it can be fixed in different rotational positions. According to a first possibility, fixing of the adjusting element in several rotational positions can be effected continuously, which is achieved in that the adjusting element comprises an arch-shaped oblong hole, into which a fixing element can be inserted and braced relative to the housing. According to an alternative second possibility, the adjusting element can be designed such that a rotational adjustment can take place in steps. For this, the adjusting element can comprise in particular a row of through-bores which are arranged arch-like and which, more particularly, can overlap one other. An especially advantageous production and mounting is effected in that exactly one fixing element is provided by which the adjusting element can be fixed to the housing in several rotational positions. In this case, the fixing element assumes two functions, i.e., fixing the sensor at the housing and rotationally fixing the adjusting element in the required rotational position.

According to a second possibility, the adjusting means can comprise an axially movable adjusting element in which the sensor is fixed and a rotation-translation converter by which the adjusting element is axially displaceable relative to the stationary housing. In this case, the adjustment is effected by a translatory movement of the adjusting element, instead of a rotational movement, as in the case of the eccentric adjusting element. The rotation-translation converter can comprise a supporting element with an axial threaded bore, as well as a adjusting screw which can be threaded into the threaded bore, with the screw end being non-displaceably connected to the adjusting element. By threading the screw in and out respectively, the adjusting element and thus the sensor are moved along the stationary housing away from the supporting element and towards same respectively. The supporting element can be provided, for example, in the form of a projection formed onto the housing and extending outwardly, in which projection a bore is provided with a bore axis extending in the direction of displacement.

In an example embodiment, guiding means are provided by which the adjusting element is longitudinally displaceable relative to the stationary housing. The guiding means can be provided in the form of a mechanism or device which allows a translatory movement of the adjusting element relative to the housing. Thus, the guiding means can also be referred to as a guiding mechanism or guiding device. For example, the guiding means can comprise one or several oblong holes in the adjusting element, which holes extend in the direction of displacement and through which respectively a screw is threaded into the housing.

To achieve a clearance-free connection between the displaceable adjusting element and the adjusting screw, elastic tensioning means can be provided which generate a pretensioning force between said components. Generally, the pretensioning means can be any assembly which pretensions the adjusting element relative to the adjusting screw. To that extent, the pretensioning means can also be referred to as a pretensioning assembly. The pretensioning means are able to store potential energy and have an elastic returning effect. For example, the pretensioning means can comprise an elastic element such as a spring. The elastic element can be arranged coaxially relative to the adjusting screw, and with a first end can be supported on the adjusting element and with the other end on the supporting element. The pretensioning means ensure that the adjusting element is at least indirectly pretensioning relative to the housing, thus allowing accurate positioning conditions.

According to a possible embodiment, the actuator can be provided in the form of an electro-magnetic actuator and comprises an annular electro-magnet which is supported on the stationary housing, as well as an axially movable piston which is effectively connected to the first clutch part. The electro-magnet can comprise a magnet housing with a greatest outer diameter, wherein a greatest outer diameter of the target element can be smaller than the outer diameter of the magnet housing. Alternatively or in addition it is possible that the greater outer diameter of the sensor object is smaller than the root diameter of an annular gear connected to the first drive part. It is particularly advantageous if the target element comprises the smallest possible radial extension and/or diameter. By means of a small target element plunging losses are kept low, which advantageously effects the efficiency of the clutch, and the amount of oil displacement remaining low, which, in turn, allows particularly short clutch switching times. However, it is understood that the outer diameter of the target element can also be greater than the outer diameter of the magnet housing and the base diameter of the annular gear respectively.

A drive assembly, more particularly for a motor vehicle driving axle driven by an electric motor, comprises a clutch assembly which is designed in accordance with at least one of the above-mentioned embodiments; a differential drive with differential gears and sideshaft gears, wherein the first drive part is provided in the form of a differential housing and the second drive part in the form of a differential carrier to which the differential gears are connected.

The drive assembly, analogously, provides the same advantages as the clutch assembly, so that, in that respect, reference can be made the above description. Due to the specific design of the sensor, simple mounting procedures, accurate sensing of the clutch position and, should a service be necessary, easy exchangeability of the sensor are ensured. Because the sensor position can be adjusted, it is possible to accurately sense the path signal, which, in turn, allows the drive assembly to be controlled accurately and quickly.

The drive assembly can comprise an electric motor as a drive, and the unit formed in this way can also be referred to as an electric drive. In the power path between the electric motor and the drive assembly a reduction gearing can be provided, with and without a transmission stage. It is understood that any other form of motor/engine can also be used as a drive, for instance an internal combustion engine.

Example embodiments will be described below with reference to the Figures wherein:

FIG. 1 shows an exemplary clutch assembly in a longitudinal section in a first embodiment;

FIG. 2 shows a sensor unit of the clutch assembly according to FIG. 1 as a detail in a perspective view;

FIG. 3A shows the adjusting element shown in FIGS. 1 and 2 as a detail in a plan view;

FIG. 3B shows the adjusting element shown in FIGS. 1 and 2 as a detail in a side view FIG. 3C shows the adjusting element shown in FIGS. 1 and 2 as a detail in a perspective view;

FIG. 4 shows an adjusting element for an another exemplary clutch assembly in a perspective view;

FIG. 5 shows an a further exemplary clutch assembly in half a longitudinal section;

FIG. 6 shows a further exemplary clutch assembly in a longitudinal section;

FIG. 11A shows the sensor unit of the clutch assembly of FIG. 10 as a detail in a plan view;

FIG. 11B shows the sensor unit of the clutch assembly of FIG. 10 as a detail in a side view;

FIG. 11C shows the sensor unit of the clutch assembly of FIG. 10 as a detail according to sectional line 11C-11C of FIG. 11B;

FIG. 11D shows the sensor unit of the clutch assembly of FIG. 10 as a detail according to sectional line 11D-11D of FIG. 11A;

FIG. 11E shows the sensor unit of the clutch assembly of FIG. 10 as a detail according to sectional line 11E-11E of FIG. 11A;

FIG. 11F shows the sensor unit of the clutch assembly of FIG. 10 as a detail of FIG. 11C.

Figure 7A:
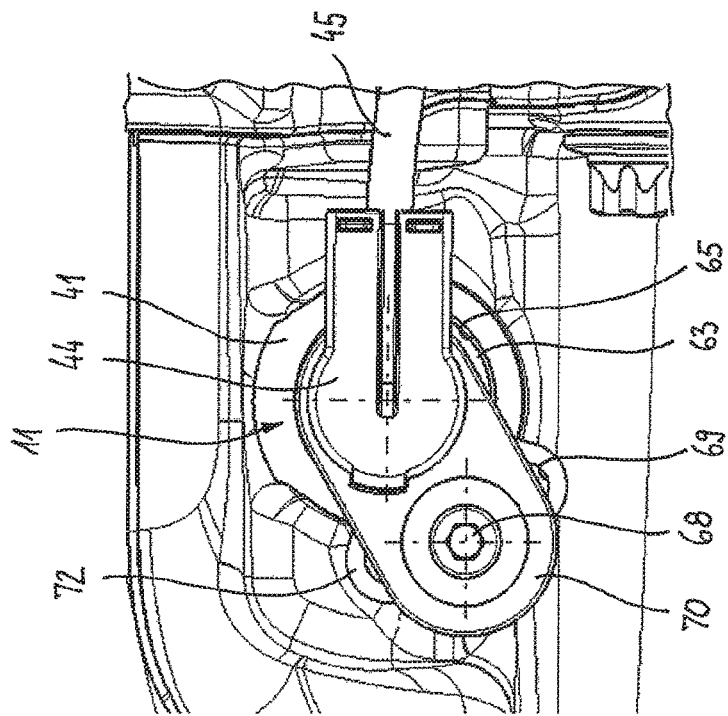
FIG. 7A shows further details of the sensor unit of the clutch assembly according to FIG. 6 in the mounted condition in a longitudinal section through the clutch assembly.

FIGS. 1 to 3 which will be described jointly below show a first example of a clutch assembly 2. The clutch assembly 2 comprises a clutch 4, an actuator 5 for operating the clutch 4 and a sensor unit 11. The clutch 4 can selectively transmit torque to a transmission unit 3 following in the power path. The transmission unit 3 is provided in the form of a differential drive without being limited thereto. The clutch assembly 2 with the transmission unit 3 which jointly can also be referred to a drive assembly 47 is for being used in the driveline of a motor vehicle, specifically for distributing an introduced torque to the two sideshafts of the motor vehicle, wherein a transmission of torque between a drive source of the motor vehicle and the sideshafts can optionally be effected or can be interrupted. The clutch 4 is operated by the actuator 5 which acts on the first clutch part 25.

The clutch 4 is arranged in the power path between a first drive part 7 and a second drive part 13. The first drive part 7 is provided in the form of a rotatingly drivable housing in which the clutch 4 is accommodated. To that extent, the first drive part 7 can also be referred to as a clutch housing. The second drive part is provided in the form of a carrier element 13 of the transmission unit 3 which is rotatably received in the clutch housing. The clutch housing 7 is firmly connected to a drive gear 6, in particular by welding, with other connecting methods, such as threaded connections, also being possible. Via the drive gear 47, torque from a drive motor (not illustrated) can be introduced into the drive assembly 47 for driving the differential drive 3. The clutch housing 7 is provided in two parts and comprises a first housing part 8 and a second housing part 9 which, in the region of their aperture-facing ends, each comprise a flange portion 10, 12 by which they are connected to the drive gear 8. The differential drive 3 is received in the clutch housing 7 and supported so as to be rotatable around the axis of rotation A7. The clutch housing 7 is rotatably supported in the stationary housing 41 around the rotational axis A7 by bearing means 61, 62.

The carrier element 13 of the differential drive 3 is annular in shape and comprises a substantially cylindrical outer face 14 by which the carrier element 13 is rotatably supported relative to a respective inner cylindrical portion 15 of the clutch housing 7 around the axis of rotation A7. Two bores are provided in the carrier element 13 into which a journal 17 is inserted and fixed by a securing pin 18. Two differential gears 19 are rotatably supported around a journal axis. The two differential gears 19 engage a first and a second sideshaft gear 20, 22 which are arranged coaxially relative to the rotational axis A7. The two sideshaft gears 20, 22 each comprise splines 23 into which corresponding counter teeth of the sideshaft (not shown) can be inserted for transmitting torque. The two sideshaft gears 20, 22 are each axially supported against to the housing 7 via friction-reducing discs.

The clutch 4 is provided in the form of a form-locking clutch, in particular as toothed clutch, wherein other clutches can be used as well, for example a claw clutch or a friction clutch. The form-locking clutch 4 comprises a first clutch part 25 which is connected to the housing 7 in a rotationally fixed and axially movable way, as well as a second clutch part 26 which is firmly connected to the carrier element 13. The first clutch part 25 is axially movable relative to the second clutch part 26 and transmitting torque can be inserted into same for transmitting torque, so that a form-locking connection between the two clutch parts 25, 26 is effected. By disengaging the clutch part 25, the transmission of torque can be interrupted again.

The first clutch part 25 comprises an annular portion 21, which is arranged inside the clutch housing 7, and a plurality of circumferentially distributed cam elements 27 which extend from the annular portion 21 in axial direction. The cam elements 27 can also be referred to as axial projections. The cam elements 27 extend through circumferentially distributed openings 28 of the housing 7 for transmitting torque, so that the first clutch part 25 rotates jointly with the rotatingly drivable housing 7. The first clutch part 25 is axially guided relative to the housing 7 and is centred coaxially to the rotational axis A7. The guiding and centring is effected via pairs of surfaces which are each formed between an outer face of a cam element 27 and an inner face of an associated housing aperture. Alternatively, centring can also be effected via a cylindrical outer face of the annular portion 21 relative to the inner face of the housing 7.

At the end sides facing one another, the first and the second clutch part 25, 26 each comprise formed-on form-locking elements which can be made to engage for transmitting torque. By controlling the actuator 5, the first clutch part 25 can be moved axially relative at to the second clutch part 26, wherein the transmission of torque from the driving gear 6 to the differential drive 3 is ensured in the engaged condition whereas the torque transmission is interrupted in the disengaged condition.

The actuator 5 comprises an electric magnet 29 as well as a piston 30. The actuator 5 is designed such that the piston 30 is loaded towards the clutch 4 when the electro-magnet is supplied with current. For this purpose, the electro-magnet 29 comprises an annular magnet housing 32 which surrounds a coil and which comprises an aperture 33 at a radial inner end facing the clutch 4. Inside a radially inner housing portion, the piston 30 is arranged so as to be axially movable. The magnet housing 32 is supported on a sleeve projection of the housing part 9 by a carrier element 31 and is supported against the stationary housing 41 via fixing means (not shown).

The piston 30 comprises a first piston part 34 consisting of a ferro-magnetic material, for instance an iron material, as well as a second piston part 35 consisting of a non-magnetic or paramagnetic material, for instance high-grade steel, copper or aluminium. The first piston part 34 and the second piston part 35 are sleeve-shaped and are connected to one another, in particular by a press fit connection. Because the first piston part 34 is produced from a ferro-magnetic material, it is moved—when actuating the electro-magnet 29—towards the clutch 4 because of the magnetic field. To that extent, the first piston part 34 can also be referred to as an anchor. Because of the axial displacement of the first piston part 34, the gap 33 is bridged. In the end position, the first piston part 34 comes to rest against a shoulder 81 of the magnet housing 32. The second piston part is para-magnetic in order to prevent an undesirable leakage of magnetic flow towards the other components.

The first piston part 34 is centred with an outer face relative to an inner face of the magnet housing 32 and is arranged so as to be axially displaceable. To prevent the piston 30 from undesirably adhering to the magnet housing 32, the outer face of the first clutch part 34 can be coated with a friction-reducing sliding face. The second piston part 35 is axially longer than the first piston part 34 and comprises an end face which is in contact with a sliding ring 37. The sliding ring 37, in turn, is axially supported relative to the first clutch part 25 via a target element 38. The movement of the target element 38 is sensed by the sensor 44. The target element 38 which can also be referred to as a measuring or sensing object, is provided in particular in the form of an annular disc which is connected to the first clutch part 25. For this, the annular disc comprises radially inside a plurality of circumferentially distributed and axially extending elastic engaging elements 39 which, via their ends, form-lockingly engage one or several corresponding undercuts 40 of the first clutch part 25. At its radially outer end, the annular disc 38 comprises a cylindrical portion 42. A returning spring 43 is arranged between the clutch housing 7, respectively the second housing part 9, and the target element 38. In the present embodiment, the returning spring 43 is provided in the form of a plate spring, wherein other types of spring, for example helical springs, can also be used.

A sensor 44 is provided which cooperates with the target element 38 in such a way that the sensor can sense an axial position of the target element and can pass same to an electronic control unit (not shown). The sensor 44 is provided in the form of a Hall sensor which is able to record the distance from the target element 38 in a contactless way. However, a different type of contact-less sensor can also be used, for instance an inductive sensor. The sensor 44 is inserted from the outside into the stationary housing 41 and is releasably connected to same. A connecting cable 45 is provided for providing a connection with the electronic control unit. The sensor signals are further processed in the electronic control unit, with the distance between the target element 38 and the sensor 44 being determined. This makes it possible to determine the switching condition of the clutch 4, which can be used for controlling the drive motor.

It can be seen that the sensor 44, with its sensor axis A44, is arranged perpendicular, respectively radially, with reference to the rotational axis A7. With reference to a plane that extends perpendicularly to the axis of rotation A7, the sensor 44 may enclose an angle that amounts to 0 to ±30 degrees. For adjusting the sensor 44 relative to the target element 38, adjusting means 46 are provided which will be explained in greater detail below. The adjusting means are provided in the form of a mechanism or device by which the position of the sensor can be varied and/or adjusted relative to the housing. To that extent, the adjusting means can also be referred to as an adjusting device or an adjusting mechanism. In the present example, the adjusting means 46 are designed such that the sensor 44 can be adjusted relative to the stationary housing radially and/or axially with reference to the rotational axis A7. For radially adjusting the sensor 44 it is possible to use a spacing disc (not shown) which can be inserted between a supporting face of the sensor 44 and a contact face of the stationary housing 41. Such a spacing disc for radially adjusting the distance between the sensor 44 and the target element 38 is optional and only required in those cases where the given radial distance does not yet correspond to a predetermined value.

The unit consisting of the sensor 44 and adjusting means 46 of FIG. 1 is shown as a detail in FIG. 2. In the present embodiment, the setting means 46 comprise an adjusting element 63 which is rotatable relative to the housing 41 and which, in detail, is shown in FIGS. 3A to 3C, and a fixing element by means of which the adjusting element 63 can be fixed relative to the housing 41 in the required rotational position. The adjusting element 63 comprises a sleeve portion 64 with which the adjusting element 63 is rotatably positioned in a bore 65 of the stationary housing 41. The sleeve portion 64 comprises a cylindrical outer face with a continuous annular groove 66 for inserting a sealing ring (not shown) and a through-bore 67 with a cylindrical inner face. The axes of the outer and inner face comprise an offset O1, O2 relative to one another, i.e. they are arranged eccentrically relative to one another. To that extent, the sleeve portion 64 can also be referred to an eccenter and the adjusting element 63 as an eccentric element. The sensor 44 is inserted into the through-bore 67 of the eccentric element 63. For fixing the sensor 44 at the adjusting element 63 a screw 68 is provided which is threaded into a threaded bore 51 in the eccentric element 63. The eccentric element 63 can be fixed in several rotational positions relative to the stationary housing 41. Because the through-bore 67 is offset relative to the outer face of the sleeve portion 64, a rotational movement of the eccentric element 63 relative to the housing 41 leads to a displacement of the sensor 44 in the housing in an axial direction.

The eccentric element 63 comprises an arch-shaped oblong hole which essentially extends coaxially relative to the outer face of the sleeve portion 64. Once the required axial position of the sensor 44 is achieved by rotating the eccentric element 63, the latter is fixed to the housing 41 by a fixing element in the form of a screw (not shown). For this purpose, the screw is inserted through an oblong hole 69 and threaded into a threaded bore in the stationary housing 41. By providing an oblong hole 69, the eccentric element 63, in the present embodiment, permits continuous rotational adjustment and fixing of the sensor 44 relative to the housing 41. The eccentric element 63 is designed in particular such that by being rotated relative to the sensor 44 and the stationary housing 41, respectively, an axial adjustability of the sensor 44 relative to the target element 38 is achieved of up to ±0.5 mm. In this way it is possible for the sensor 44 to be positioned accurately, which, in turn, leads to the clutch position to be detected accurately. Said axial adjustability is shown in FIG. 1 symbolically by an arrow P.

FIG. 4 shows an eccentric element 63 in an alternative embodiment which largely corresponds to that shown in FIG. 3, so that as far as common features are concerned, reference is made to the above description. Thereby identical or modified details have been given the same reference numbers as in FIG. 3. The eccentric element according to FIG. 4 differs from that shown in FIG. 3 only in that instead of an oblong hole, a row of several through-bores 69 is provided. The bore axes are positioned substantially on a radius around the axis of the outer sleeve face 64. It can be seen that the individual bores 69 overlap each other in the circumferential direction. Depending on the rotational position of the eccentric element 63, the fixing screw—depending on requirements—can be inserted into each individual bore 69. In this way, the present embodiment of the eccentric element 63 permits the eccentric element 63 to be rotated stepwise and thus the sensor 44 to be axially adjusted stepwise.

FIG. 5 shows a further exemplary clutch assembly 2 which largely corresponds to that shown in FIGS. 1 to 3 so that, to that extent, reference is made to the description of same. Identical details having been given the same reference numbers as in FIGS. 1 to 3, and for the sake of simplicity, only some of the reference signs are shown.

The present example according to FIG. 5 only differs in that the sensor 44 is directed towards the cylindrical face 42 of the target element 38. The target element 38 comprises a smaller diameter and/or radius R38 than given in the embodiment according to FIG. 1, so that, overall, the assembly is more compact. It is provided that the radially inner end of the sensor 44 comprises a distance from the rotational axis A7 and, respectively, is positioned on a radius which is smaller than the tip radius and/or root radius of the driving gear 6. Furthermore, the radius R38 of the target element 38 can be smaller than the root radius of the driving gear 6. In this way it is ensured that at least the differential 3, the clutch 4 and the target element 38 can form part of a unit which can be pre-assembled, wherein said unit in a pre-assembled condition can be axially mounted in the stationary housing 41, with the driving gear 6 is brought into engagement with a driving pinion (not shown). The mode of operation of the sensor 44 is the same as mentioned in the above embodiment, to the description of which reference is hereby made.

Figure 7B:
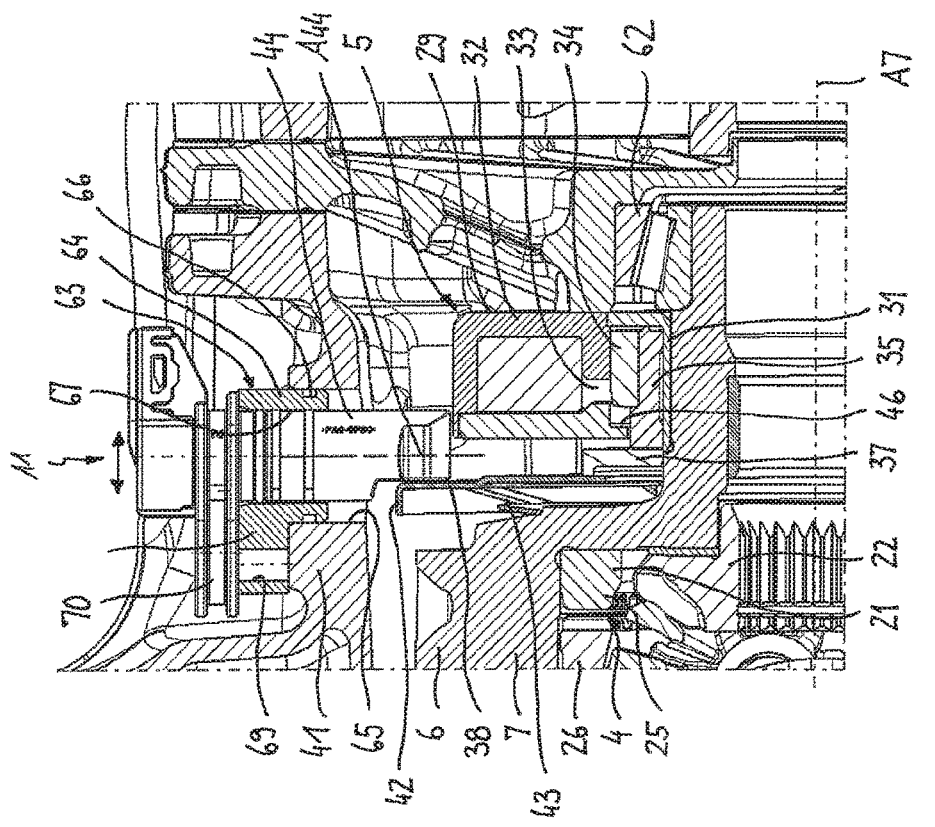
FIG. 7B shows further details of the sensor unit of the clutch assembly according to FIG. 6 in the mounted condition in a plan view of the sensor unit.
Figure 8A:
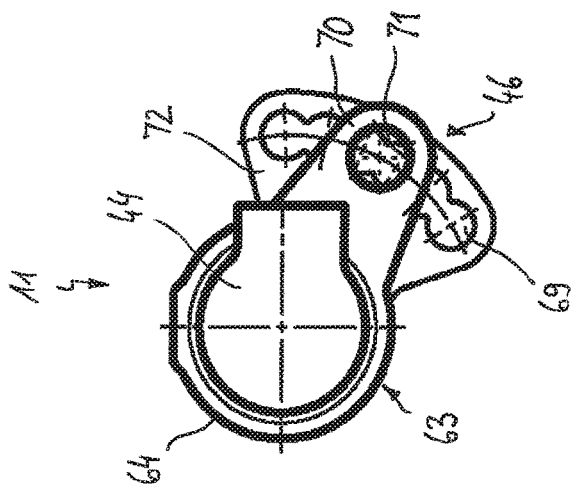
FIG. 8A shows a sensor unit according to FIGS. 6 and 7 as a detail in a plan view.
Figure 8B:
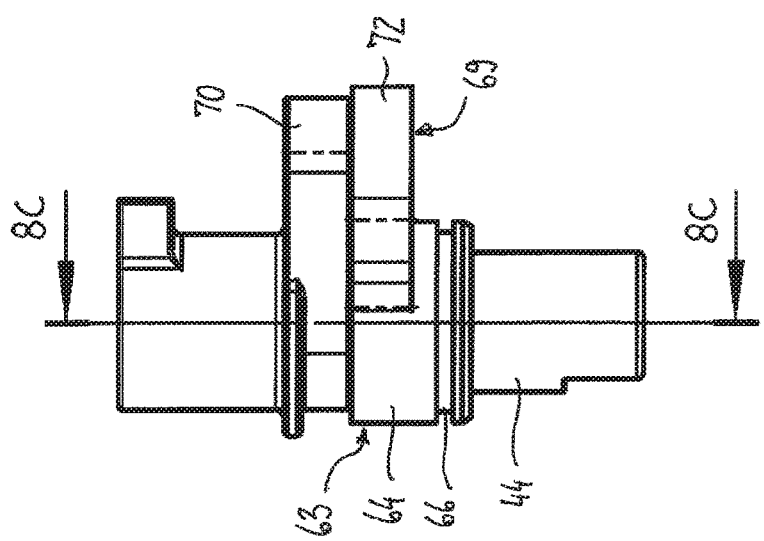
FIG. 8B shows a sensor unit according to FIGS. 6 and 7 as a detail in a side view.
Figure 8C:
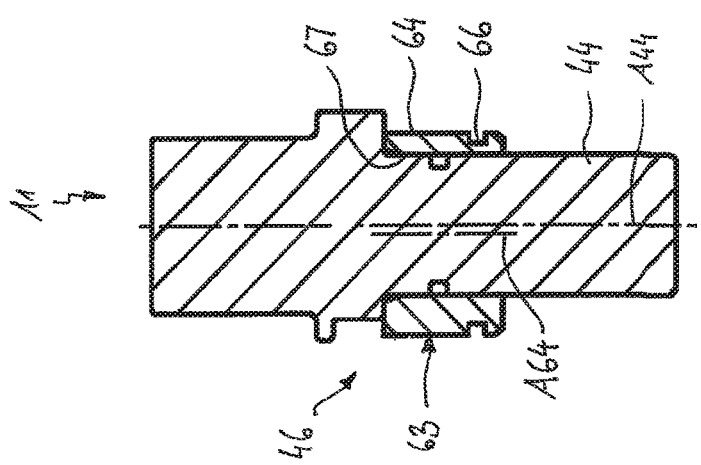
FIG. 8C shows a sensor unit according to FIGS. 6 and 7 as a detail in a longitudinal section according to sectional line C-C of FIG. 8B.

FIGS. 6 to 8, which will be described jointly below, show a further exemplary clutch assembly 2. The present example largely corresponds to that shown in FIGS. 1 to 4, so that, as far as common features are concerned, reference is made to their description. Identical and modified details respectively have been given the same reference numbers as in FIGS. 1 to 4.

A special feature of the present example is that only one fixing element 68 is required for adjusting the rotational position of the adjusting element 63 and for fixing same to the stationary housing 41. For this it is proposed that the sensor 44 comprises a sensor housing with a projection 70 which extends radially outwardly with reference to the sensor axis A44 and which is provided with an axial through-bore 71. In an axial view, the through-bore 71 of the sensor projection 71 is aligned with the row of through-bores 69 of the adjusting element 63. A rotation of the adjusting element, i.e., eccentric element 63 relative to the sensor 44 with the projection 70 fixed thereto, results in an axial displacement of the sensor 44 with reference to the rotational axis A7 of the clutch assembly. A fixing element 68, e.g., in the form of a screw, passing through the aligned bores 71, 69 in the required rotational position, thus fixes the sensor 44 relative to the eccentric element 63 and fixes the eccentric element at the stationary housing 41 which is engaged by the fixing element 68. The relative rotational position of the sensor 44 relative to the stationary housing 41 always remains unchanged, in fact independently of the rotational position of the eccentric element 63, i.e., independently of the bore 69 of the row of bores through which the fixing element 68 is inserted.

Figure 9:
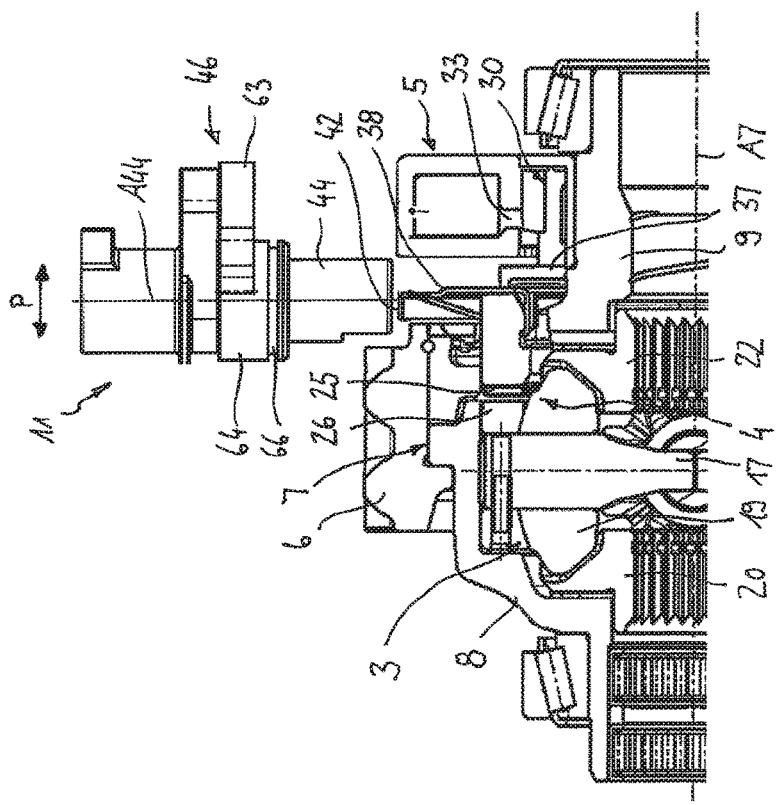
FIG. 9 shows an a further exemplary clutch assembly in half a longitudinal section.

FIG. 9 shows a further exemplary clutch assembly 2 in a modified form of that shown in FIGS. 6 to 8 to the description of which reference is hereby made as regards common features. Identical details have been given the same reference numbers as those used in FIGS. 6 to 8, wherein for the sake of simplicity only some of the reference numbers are shown.

The present example as shown in FIG. 9 differs from that shown in FIGS. 6 to 8 in that the sensor 44 is directed towards the cylindrical face 42 of the target element 38 and that the target element 38 has a smaller diameter. In that respect, the present embodiment according to FIG. 9 is similar to that according to FIG. 5 to the description of which reference is also made. It is possible in particular that the radially inner end of the sensor 44 comprises a distance from the rotational axis A7 and/or is positioned on a radius which is smaller than the tip radius and/or the root radius of the driving gear 6. Furthermore, the radius R38 of the target element 38 can be smaller than the root radius of the driving gear 6. The sensor unit 11 corresponds to that according to FIGS. 6 to 8.

Figure 10:
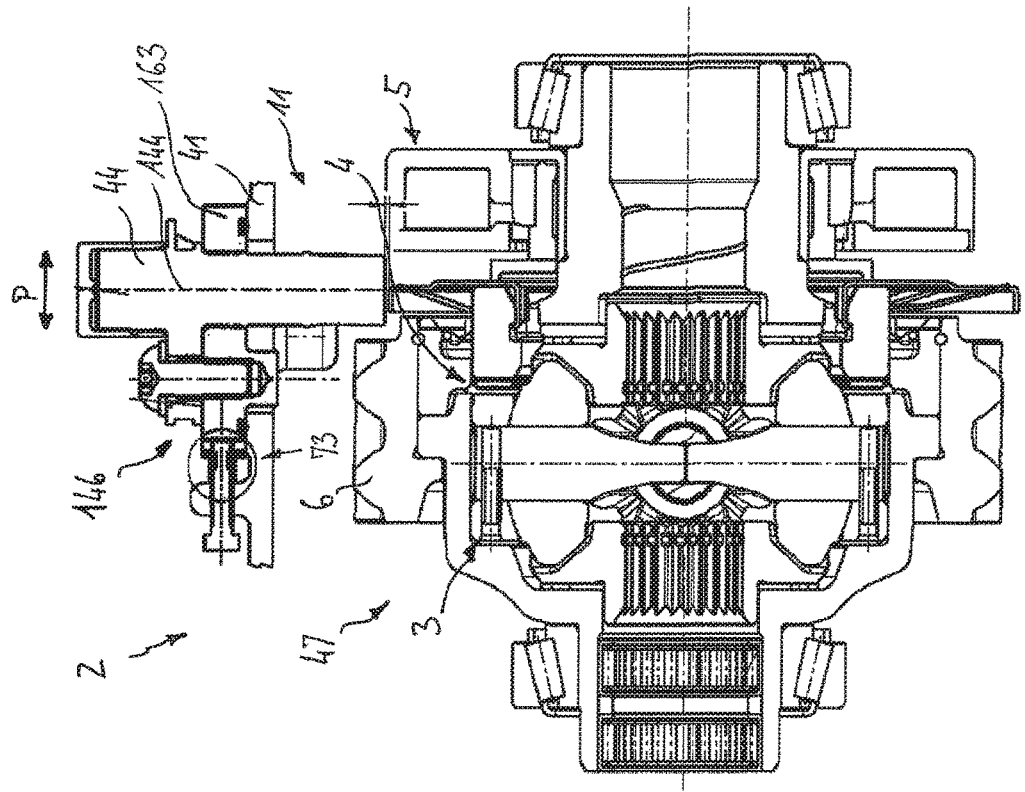
FIG. 10 shows a further exemplary clutch assembly in a longitudinal section.

FIGS. 10 and 11 which will be described jointly below show a further exemplary clutch assembly 2. The present example largely corresponds to that shown in FIGS. 1 to 3 to the description of which reference is hereby made. Identical and/or modified details have been given the same reference numbers or are increased by the FIG. 100 relative to those given in FIGS. 1 to 3.

A special feature of the present example is that the adjusting means 146 comprise a translatorily displaceable adjusting element 163 in which the sensor 44 is received, and a rotation-translation converter 73 with which the adjusting element 163 is axially displaceable relative to the stationary housing 41. In this case, axial adjustment is effected by a translatory movement of the adjusting element 163. The rotation-translation converter 73 comprises a supporting element 74 which is connected to the housing 41, in particular integrally formed to the housing and an adjusting screw 75 which is threaded into the threaded bore. A thickened end 80 of the adjusting screw 75 is connected to the adjusting element 163 such that it is rotatable and non-displaceable relative to same. By rotating the adjusting screw 75, the adjusting element 163, and together therewith, the sensor 44 are axially moved along the stationary housing 41. The sensor 44 is firmly connected to the adjusting element 163 via a screw 68. To achieve an axially play-free connection between the adjusting element 163 and the adjusting screw 75 there are provided pretensioning means 79 which generate a pretensioning force between said parts. The pretensioning means 79 are provided in the form of a helical screw which is arranged coaxially relative to the setting screw 75. An end of the spring 79 is axially supported on the adjusting element 163 and the other end is axially supported on the supporting element 74. For guiding purposes, the adjusting element 163 comprises two oblong guiding holes 76 through which a screw 77 is inserted and threaded into an associated threaded bore in the housing 41. The adjusting element 163 is sealed relative to the housing 41 by a seal 78.

Figure 12:
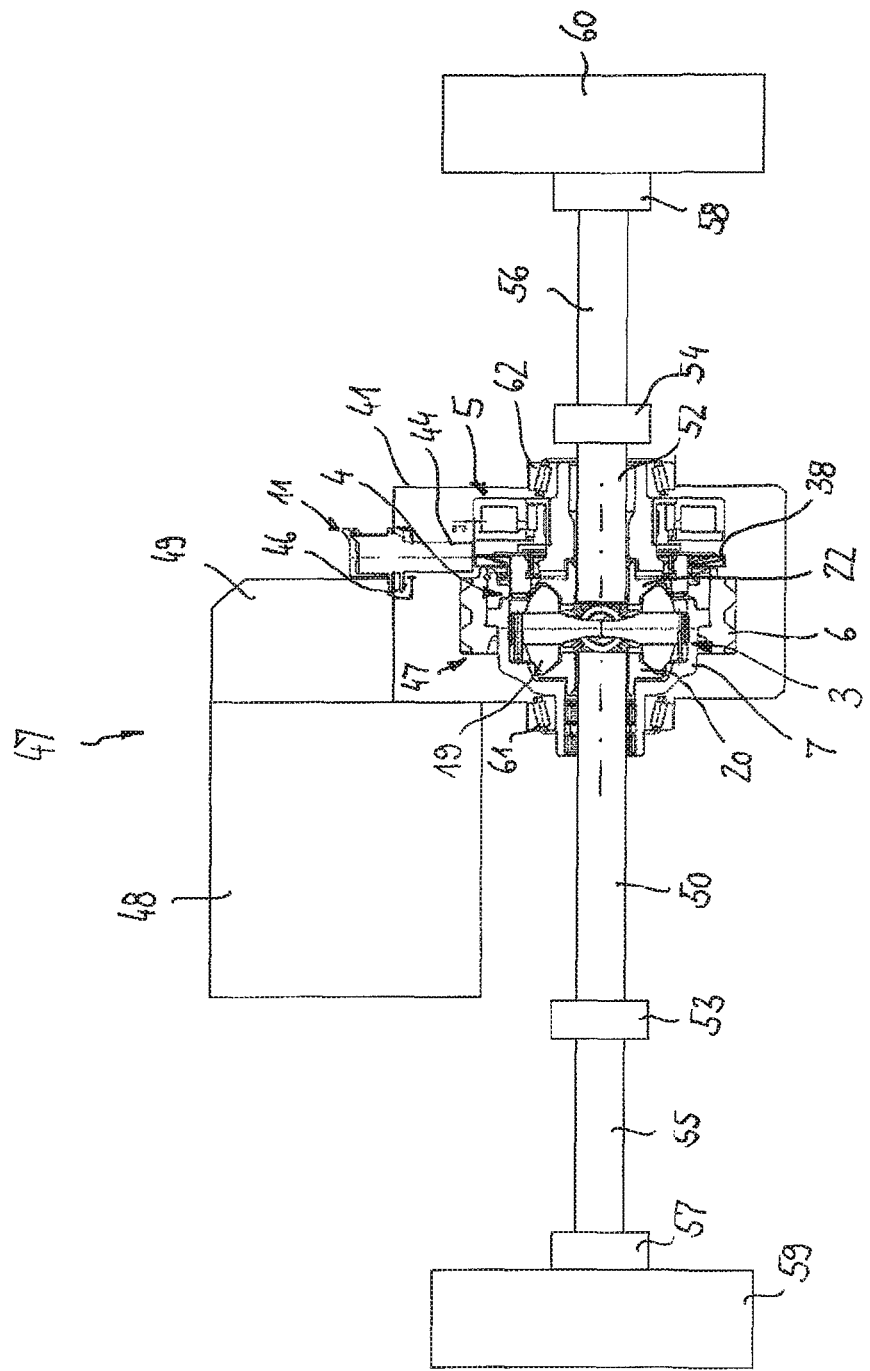
FIG. 12 shows schematically a clutch assembly according to the example of FIG. 5 as part of an electric drive.

FIG. 12 shows the clutch assembly 2 according to the example of FIG. 5 as part of an electric drive 47 in a diagrammatic view. The electric drive 47 comprises an electric motor 48 which, via a transmission stage 49, drives the clutch assembly 2 and the driving gear 6 of the clutch assembly 2. With a closed clutch assembly 2, the differential drive 3 transmits the introduced torque to the two sideshafts 20, 22. Respective sideshafts 50, 52 are inserted into the longitudinal teeth 23 of the sideshafts gears 20, 22 in a rotationally fixed way for transmitting torque. At the ends of the sideshafts 50, 52 there are provided constant velocity joints 53, 54 which, in turn, via drive shafts 55, 56 and joints 57, 58 are connected to wheels 59, 60 of the motor vehicle for transmitting torque. It can be seen that the drive assembly 2 is rotatably supported relative to the stationary housing 41 around the rotational axis A7 via bearings 61, 62. It is understood that an electric drive 47 according to the invention could also comprise any other of the above-mentioned inventive clutch assemblies according to FIGS. 1 to 4 and 6 to 11.

All the above-mentioned clutch assemblies 2 have in common that the sensor 44 can be easily mounted, is axially adjustable and easily accessible from the outside of the stationary housing 41. With aid of the adjusting means 46, 146, the position of the sensor 44 relative to the stationary housing 41 and thus to the target element 38 can be adjusted accurately. Thus, overall the position of the target element 38 and thus the coupling position of the clutch 4 is accurately detected.

The invention claimed is:

1. A clutch assembly comprising
    a housing;
    a first drive part which is rotatingly drivable around an axis of rotation;
    a second drive part which is rotatable relative to the first drive part;
    a clutch arranged in the power path between the first drive part and the second drive part and which comprises a first clutch part which is connected to the first drive part in a rotationally fixed and axially movable way and a second clutch part which is drivingly connected to the second drive part;
    a controllable actuator arranged to actuate the clutch by axially moving the first clutch part relative to the second clutch part;
    a sensor unit configured to determine a position signal which represents an axial position of the first clutch part, wherein the sensor unit comprises a target element which is at least indirectly connected to the first clutch part and a sensor for sensing a position of the target element, wherein the sensor is releasably connected to the housing; and
    adjusting means for adjusting the position of the sensor relative to the housing;
    wherein the adjusting means comprises an adjusting element and at least one fixing element;
    wherein the adjusting element comprises
        a sleeve portion which, with a cylindrical outer face of said sleeve portion, is rotatably positioned in a bore of the stationary housing, and
        wherein the adjusting element further comprises a through-bore which is eccentric relative to the cylindrical outer face and into which the sensor is inserted;
    wherein the adjusting element is connectable to the stationary housing in a plurality of rotational positions by the fixing element.

2. A clutch assembly according to claim 1, wherein, with reference to a plane which extends perpendicularly to the axis of rotation, the sensor encloses an angle which amounts to 0 to ±30 degrees.

3. A clutch assembly according to claim 1, wherein the sensor and the adjusting means are connected to the housing such that they are accessible from outside when the housing is closed.

4. A clutch assembly according to claim 1, wherein the adjusting means are provided such that, with respect to the axis of rotation of the first drive part, the sensor can be axially adjusted relative to the stationary housing.

5. A clutch assembly according to claim 1, wherein the adjusting element comprises an arch-shaped oblong hole or a row of through-bores which are arranged in an arch-shaped way.

6. A clutch assembly according to claim 1, wherein exactly one fixing element is provided by which the sensor is connectable to the adjusting element and by which the adjusting element is fixable to the housing in a plurality of rotational positions.

7. A drive assembly for an electro-motively drivable driving axle of a motor vehicle, comprising:
    a clutch assembly comprising
        a housing;
        a first drive part which is rotatingly drivable around an axis of rotation;
        a second drive part which is rotatable relative to the first drive part;
        a clutch arranged in the power path between the first drive part and the second drive part and which comprises a first clutch part which is connected to the first drive part in a rotationally fixed and axially movable way and a second clutch part which is drivingly connected to the second drive part;
        a controllable actuator arranged to actuate the clutch by axially moving the first clutch part relative to the second clutch part;
        a sensor unit configured to determine a position signal which represents an axial position of the first clutch part, wherein the sensor unit comprises a target element which is at least indirectly connected to the first clutch part and a sensor for sensing a position of the target element, wherein the sensor is releasably connected to the housing; and adjusting means for adjusting the position of the sensor relative to the housing, wherein the adjusting means comprises an adjusting element and at least one fixing element;

wherein the adjusting element comprises
- a sleeve portion which, with a cylindrical outer face of said sleeve portion, is rotatably positioned in a bore of the stationary housing, and
- wherein the adjusting element further comprises a through-bore which is eccentric relative to the cylindrical outer face and into which the sensor is inserted;
- wherein the adjusting element is connectable to the stationary housing in a plurality of rotational positions by the fixing element; and a differential drive with differential gears and sideshaft gears;

wherein the first drive part is provided in the form of a clutch housing and the second drive part in the form of a differential carrier to which the differential gears are connected.

8. A drive assembly according to claim 7, wherein an electric motor is provided for driving the drive assembly.

\* \* \* \* \*